United States Patent
Klomp

[11] B 3,987,763
[45] Oct. 26, 1976

[54] ROTARY ENGINE COMBUSTION ARRANGEMENT

[75] Inventor: Edward D. Klomp, Mount Clemens, Mich.

[73] Assignee: General Motors Corporation, Detroit, Mich.

[22] Filed: Apr. 21, 1975

[21] Appl. No.: 570,172

[44] Published under the second Trial Voluntary Protest Program on February 3, 1976 as document No. B 570,172.

[52] U.S. Cl. .............................................. 123/8.45
[51] Int. Cl.² ......................................... F02B 53/00
[58] Field of Search ......................... 123/8.01, 8.45; 418/614

[56] References Cited
UNITED STATES PATENTS
3,854,456  12/1974  Ishii et al. ........................ 123/8.45

*Primary Examiner*—Carlton R. Croyle
*Assistant Examiner*—Michael Koczo, Jr.
*Attorney, Agent, or Firm*—Ronald L. Phillips

[57] ABSTRACT

A rotary engine is provided with a plenum that is charged with relatively high-pressure hot gaseous products from the working chambers during the gas expansion process but after rapid combustion is completed and then discharges these products into a trailing portion of the working chambers during the remainder of their expansion phase to cause mixing of the gases in the trailing portion with the other gases in the chamber.

3 Claims, 9 Drawing Figures

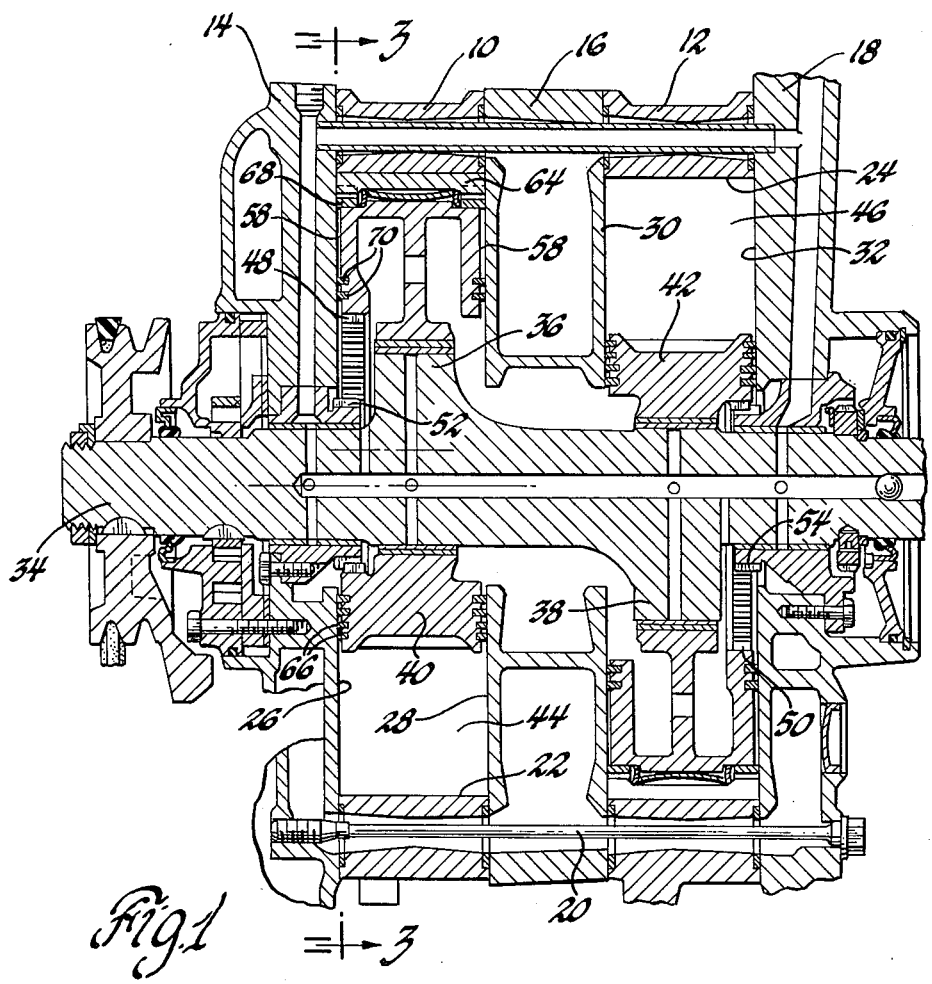
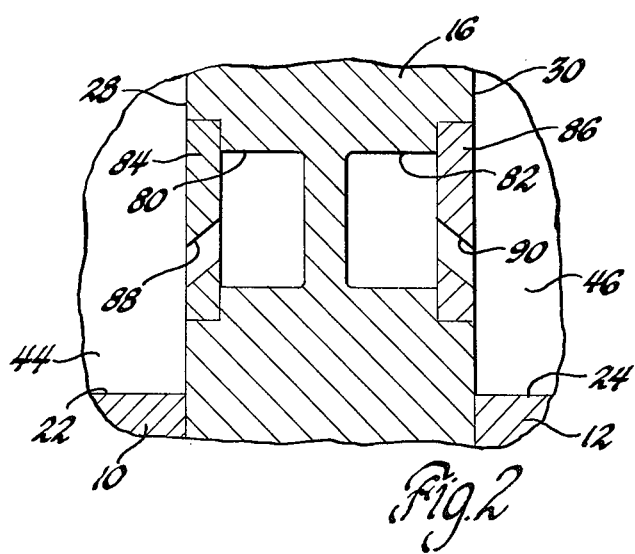

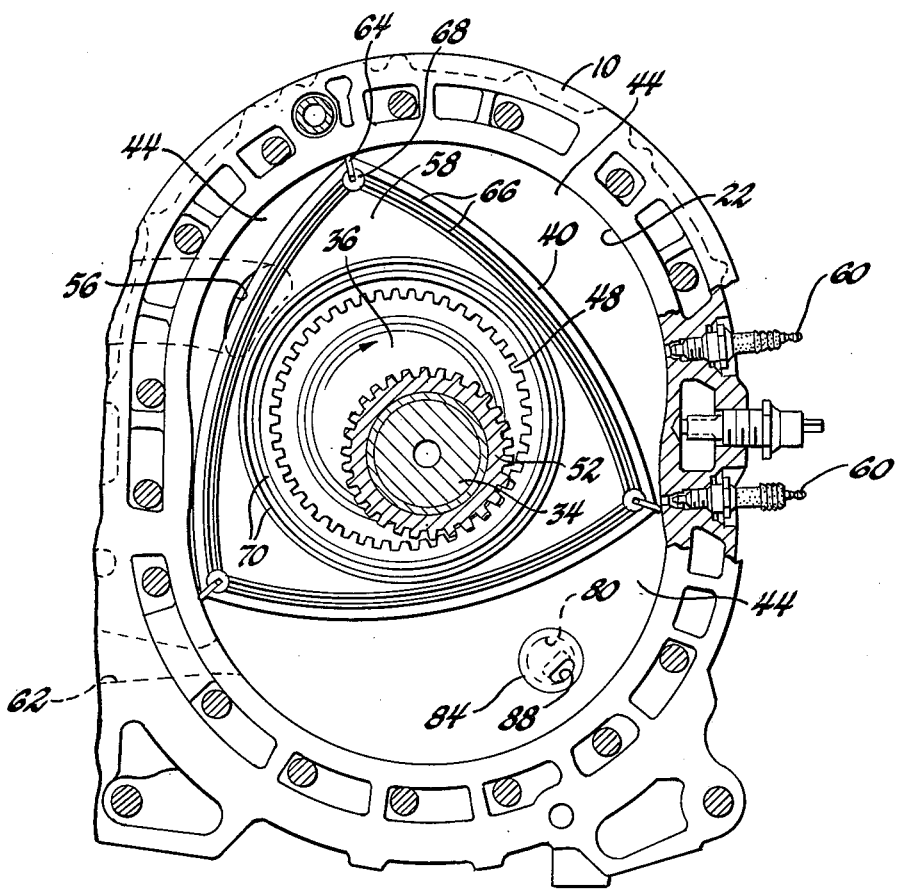
Fig. 3
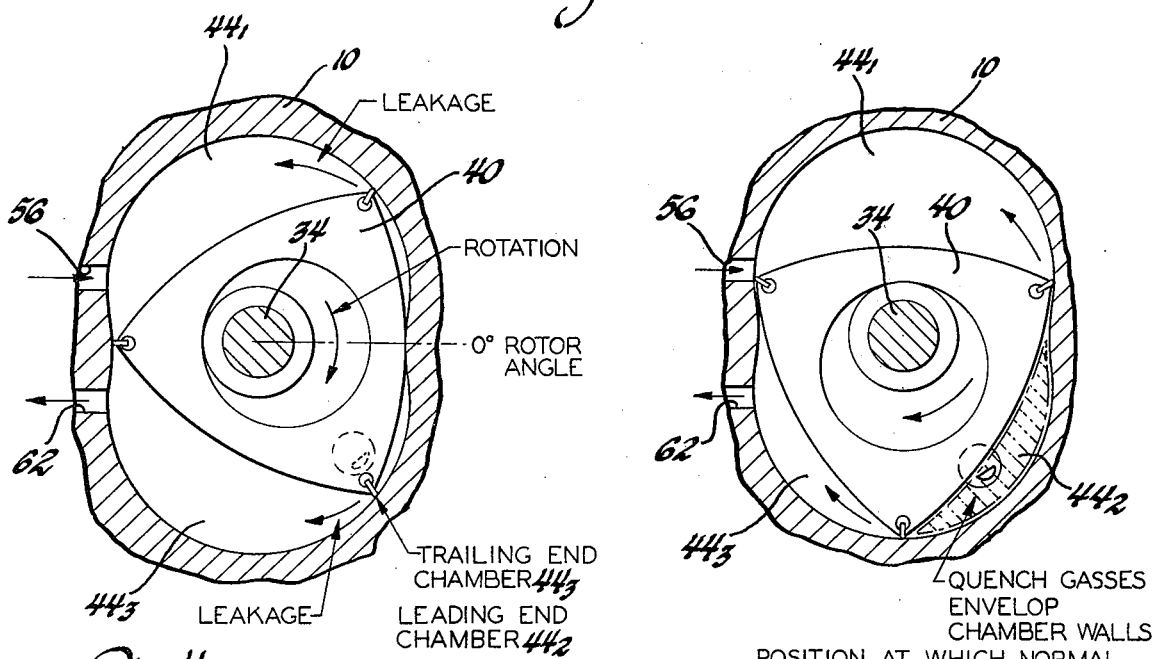
Fig. 4
Fig. 5

ROTARY ENGINE COMBUSTION ARRANGEMENT

This invention relates to a rotary engine combustion arrangement and more particularly to such an arrangement that is operable to mix gases rich in hydrocarbon in a trailing portion of the chambers with the main body of hot gases in the chambers.

In the currently produced rotary combustion engine of the planetary rotor type as herein more fully disclosed, a major problem exists in attempting to reduce hydrocarbon (HC) emission and in order to fully understand the inventive concept here, it is believed necessary to understand the origin of a major portion of these HC emissions. In this type of rotary engine it has been found that a higher concentration of unburned HC exists near the trailing end of each working chamber than in the rest of the chamber.

One source of unburned HC has been attributed to the leakage of raw fuel and air across the apex seals. This occurs when the pressure in a trailing chamber becomes higher than that in the leading chamber and continues until the flame front reaches the leading apex seal with the result that the concentration of unburned leakage gases is highest in the vicinity of the trailing end of the leading chamber. Another source of unburned HC is by reason of the flame front being extinguished near the combustion chamber walls. This region is especially thick and extensive near the trailing end because of the combustion chamber's thin wedge shape. Furthermore, combustion seems to be completed at about 30 rotor degrees after top-dead-center with the chamber surfaces then covered by an envelope of unburned gases. As the rotor rotates, the trailing apex seal and the trailing portions of the side seals scrape these unburned gases off of the peripheral wall and side walls, respectively, causing the concentration of unburned products to increase in the trailing portion of the chambers. In contrast, rotor rotation causes the leading apex seal and the leading portions of the side seals to uncover walls which are quenchzone free. As a result, when the engine's exhaust port is opened, the exhausting gases pass over only one surface on which an unburned quench layer exists, i.e., on the rotor. In this respect the rotary engine is believed to have an advantage over the conventional reciprocating engine in that the exhaust valve in the latter is surrounded by quench-layer covered surfaces. However, in the rotary engine and toward the end of the exhaust phase the unburned rich products in the trailing portion of the chambers are pushed out of the exhaust port to contribute to considerably high HC emissions.

According to the present invention it was recognized that if the gas rich in HC located near the trailing end of the chambers could be mixed into the main body of hot gases, afterburning of the HC should be enhanced and undesirable emissions lowered. This is very simply accomplished according to the present invention with an auxiliary chamber or plenum which is connectible with the main chambers through a strategically arranged nozzle. The nozzle is located relative to the rotor so that communication of the main chambers with the plenum is initiated during the gas expansion process but after rapid combustion is complete with the pressure in the plenum then relatively low. Then on establishing communication, the plenum is charged with relatively high-pressure hot products from the connected chamber until plenum and chamber pressure are equal. Thereafter on continued rotor rotation and lowering main chamber pressure below plenum pressure, there is caused a gaseous jet to be discharged out the nozzle from the plenum into a trailing portion of the connected main chamber to enhance mixing of the gases rich in HC near the trailing end with the main body of hot gases in the main chamber.

An object of the present invention is to provide a new and improved rotary engine combustion arrangement.

Another object is to provide in a rotary engine a plenum that operates through a nozzle to mix gases rich in HC near the trailing end of the main chambers with the main body of hot gases in the chambers to lower undesirable emissions.

Another object is to provide in a rotary engine a plenum that operates with a nozzle to receive gases from the main chambers during gas expansion but after rapid combustion is complete and thereafter jet these gases into a trailing portion of the main chambers to enhance mixing of the gases near the trailing end with the main body of hot gases during the remainder of the expansion phase to thereby enhance afterburning of HC into the exhaust phase and effect the lowering of undesirable emissions.

These and other objects of the present invention will be more apparent from the following description and drawing in which:

FIG. 1 is a longitudinal view with parts in section of a two-rotor rotary engine having a combustion arrangement according to the present invention.

FIG. 2 is an enlarged section view of a portion of the intermediate housing in FIG. 1 showing details of the combustion arrangement according to the present invention.

FIG. 3 is a view taken along the line 3—3 in FIG. 1 with a part of the rotor housing broken away.

FIGS. 4–8 schematically show difficult rotor positions to assist in understanding and illustrating the operation of the combustion arrangement according to the present invention.

Figure 9:
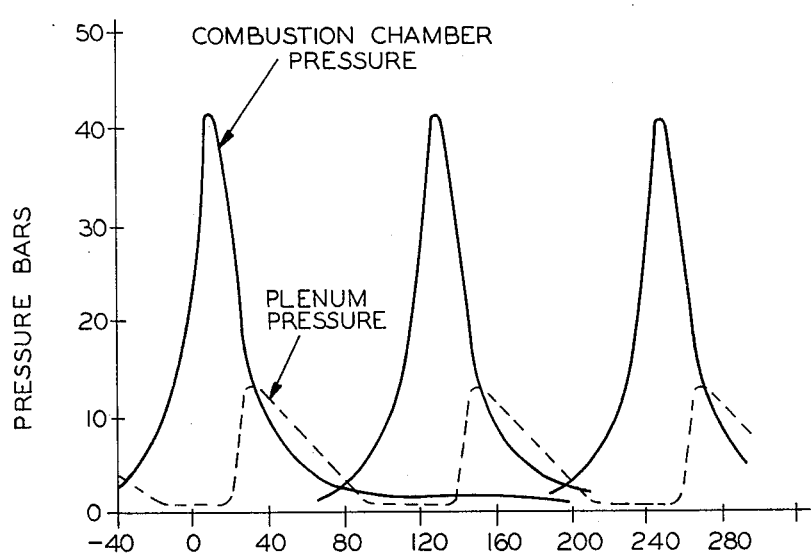

FIG. 9 is a graph showing typical pressure characteristics of the engine with the combustion arrangement according to the present invention.

The invention is disclosed in a two-rotor rotary combustion engine generally of the current production type as shown in FIGS. 1 and 3. The engine comprises front and rear rotor housings 10 and 12, a front end housing 14, an intermediate housing 16 between the rotor housings and a rear end housing 18, all clamped together by bolts 20. The rotor housings 10 and 12 are identical and have an inwardly facing two-lobe peripheral wall 22 and 24 cooperating with oppositely facing side walls 26 and 28 on the front housing 14 and intermediate housing 16 and oppositely facing side walls 30 and 32 on the intermediate housing and rear housing 18, respectively, to provide two cavities. A crankshaft 34 is rotatably mounted near its ends in the two end housings 14 and 18 as shown in FIG. 1, and has 180° apart eccentrics 36 and 38 on which triangularly shaped rotors 40 and 42 are rotatably mounted in the cavities between the respective side walls and facing the respective rotor housing peripheral wall. The rotor faces cooperate with the respective walls to provide three expansible chambers 44 and 46 about the respective rotors 40 and 42 that expand and contract twice during each rotor revolution in fixed relation to the stationary engine housing and at a fixed speed ratio with result to the crankshaft. This phase relation is enforced by internal tooth rotary phasing gears 48 and 50 which are concentric with and are formed on the outboard sides of the respective rotors 40 and 42 and mesh with stationary external tooth annular phasing gears 52 and 54 which are received about the crankshaft and are fixed to the respective end housings 14 and 18, the rotary phasing gears having one and one-half times the number of teeth as the stationary phasing gears and with the mesh of these two sets of phasing gears set diametrically opposite so that the chambers about the rotors are all sequentially phased at 60° intervals.

Fuel mixture is delivered to the front and rear chambers 44 and 46 by a suitable carburetor and intake manifold arrangement, not shown. The fuel mixture enters the chambers such as shown in FIG. 3 for the front chambers 44 by oppositely facing side intake ports 56 formed in the oppositely facing side walls. The intake ports are arranged such that they are opened to the chambers past the rotor sides 58 as the chambers expand in the intake phase and are thereafter closed by the rotor sides when these chambers then contract to compress the mixture in the compression phase as the rotor rotates in the direction of the arrow. At the end of the compression phase, the compressed mixture is ignited by one or two spark plugs 60 which are mounted on the rotor housing in peripherally spaced leading and trailing locations relative to rotor rotation with their electrodes open to the passing chambers through the peripheral wall. Upon combustion, the chambers expand in the power or expansion phase and thereafter are exhausted as they contract in the exhaust phase by an exhaust port 62 through the peripheral wall which is traversed by the rotor apexes.

Typically, the working chambers are sealed by an arrangement comprising an apex seal 64 mounted in a slot across each rotor apex, a pair of parallel side seals 66 mounted in grooves in each rotor side 58 adjacent each rotor face and a corner seal 68 mounted in a hole in each rotor side at each apex that provides a sealing link between the adjacent ends of the side seals and apex seal at each apex. The apex seals 64 are forced radially outward to engage the peripheral wall and the side seals 66 and corner seals 68 are forced axially outward to engage the opposite side wall. In addition to the gas sealing arrangements there is also normally provided a pair of circular oil seals 70 which are mounted in concentric grooves in each rotor side and are forced axially outward to engage the opposite side wall to prevent the oil used for lubrication of the crankshaft, rotor, etc., from reaching the working chambers.

In this rotary engine arrangement it has been found that a higher concentration of unburned HC exists near the trailing apex seal or end of a working chamber than in the rest of the chamber. To understand the source of this unburned HC there is schematically shown a range of rotor positions in FIGS. 4–8 in which probable leakage directions over the apex seals are indicated by arrows and to which reference will be made in defining certain key terms explaining the high HC emissions from the engine that result. One source of unburned HC is the leakage of raw fuel and air across the apex seals. This occurs when the pressure in a trailing chamber while in the combustion phase becomes higher than that in the leading chamber and continues until the flame front reaches the leading apex seal. This interval covers rotor motion from generally the position in FIG. 7 to that in FIG. 8 and relates in this case to leakage from the trailing chamber $44_1$ to the leading chamber $44_2$ which is then in the exhaust phase. Although this leakage continues until the rotor rotates beyond the position in FIG. 8, the leakage gases are then no longer raw fuel and air and are not believed important in terms of undesirable emissions. As a result, the concentration of the unburned leakage gases during the exhaust phase is more likely highest in the vicinity of the trailing apex seal of the leading chamber $44_2$, i.e. near the trailing end of or in a trailing portion of the chamber during exhaust.

Figure 6:
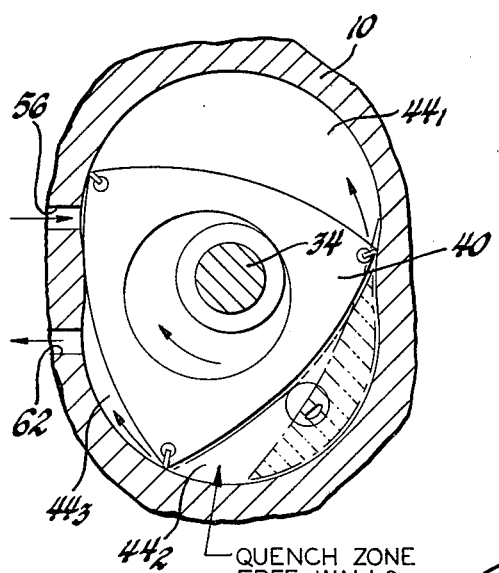
Figure 7:
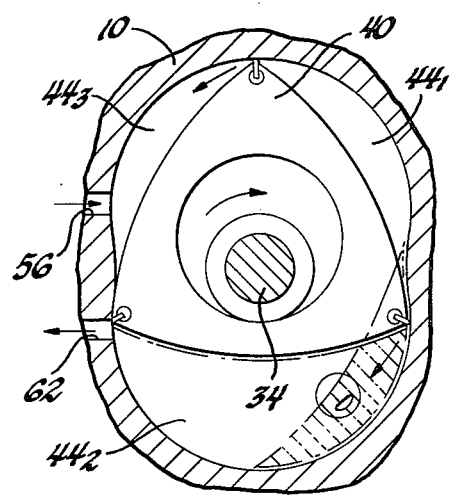
Figure 8:
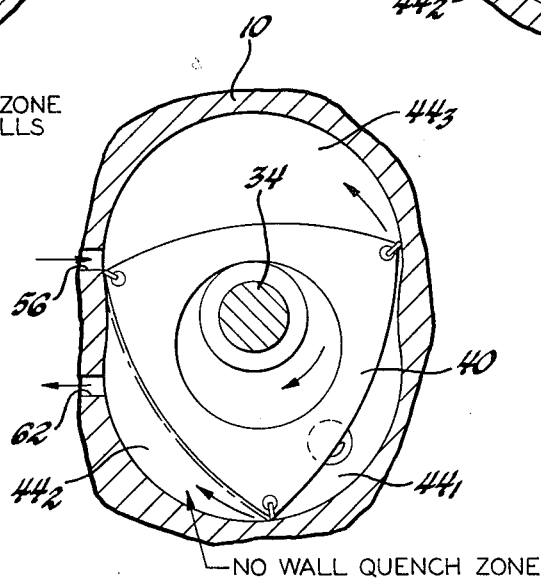

Another source of unburned HC is that formed when the flame front is extinguished near the combustion chamber walls. This region is especially thick and extensive near the trailing end of the chamber because of the chamber's thin wedge shape. This has been evidenced by the substantial difference in coloration found between the leading and trailing face surfaces of an actual rotor. Furthermore, it has been observed that combustion seems to be completed at about 30 rotor degrees after top-dead-center with the exposed surfaces then forming the chamber covered by an envelope of unburned gases as shown in the chamber $44_2$ in FIG. 5. As the rotor rotates the trailing apex seal and the trailing portions of the side seals scrape these unburned gases off the peripheral wall and side walls, respectively, causing the concentration of unburned products in the vicinity of the trailing apex seal to be increased. In contrast, rotor rotation causes the leading apex seal and the leading portions of the side seals to uncover portions of the chamber walls which are quench-zone free as illustrated in the chamber $44_2$ in FIGS. 6 and 7. As a result, when the exhaust port is opened, the exhausting gases pass over only one surface on which an unburned quench layer exists, i.e., on the rotor, as shown in FIG. 7. In this respect, it is believed that the rotary engine has an advantage over the reciprocating engine in that the exhaust valve in the latter is surrounded by quenchlayer covered surfaces. However, toward the end of the exhaust phase the concentration of rich products near the trailing end are pushed out of the exhaust port thus contributing to high base HC emissions.

According to the present invention it was recognized that if the gases rich in HC, located in the trailing region or portion of each chamber, could be mixed into the main body of hot gases in the chamber, afterburning of the HC should be enhanced and undesirable emissions lowered. The present invention accomplishes this goal with the simple provision of a plenum that is formed in one of the stationary housings of the engine assembly and communicates with the chambers through a nozzle during the expansion process but after rapid combustion is completed. In the two-rotor arrangement shown, separate plenums 80 and 82 are simply formed by axially aligned blind bores or holes in the respective side walls 28 and 30 of the intermediate housing 16 that separates the two banks of chambers 44 and 46. The respective holes are covered by caps 84 and 86 that are fixed by suitable means such as by welding in counterbores so as to be permanently flush mounted or contiguous with the associated intermediate side walls 28 and 30 on which the rotor's oppositely facing side seals and corner seals slide. Communication of the plenums 80 and 82 with the respective banks of chambers 44 and 46 is provided by nozzles 88 and 90 which are formed in the covers 84 and 86 and are angled so as to direct gases out toward the respective peripheral walls 22 and 24 away from the relatively cooler rotor surfaces and also in the direction of rotor or chamber movement.

In FIG. 9 there is shown a plot of main chamber pressure versus rotor angle for each chamber in one bank and according to the present invention the plenum nozzles 88 and 90 are located so that they are uncovered by the passing side seals during the expansion process but after rapid combustion is complete according to the main chamber pressure curve. For example, the uncovering of nozzle 88 to the chambers 44 starts when they are slightly past their 30° after top-dead rotor position as shown by the chamber $44_2$ in FIG. 5. As shown in FIG. 9, the pressure in the plenum 80 is lowest, e.g. just a few pressure bars, while the rotor is covering the nozzle 88 but then as the rotor uncovers the nozzle just after peak combustion chamber pressure there is effected an initial very large pressure differential across the nozzle, e.g. about 40 pressure bars, forcing hot gaseous products of combustion from the chamber $44_2$ into the plenum 80. As the rotor continues to rotate the plenum is thus charged with high-pressure hot gaseous products of combustion until eventually plenum and main chamber pressure equalize which as shown by the graph in FIG. 9 occurs about 5° later or 35° after top-dead-center. Continued rotor rotation then lowers main chamber pressure below plenum pressure causing the gases collected in the plenum to be discharged from the nozzle into a trailing region of the passing main chamber. The nozzle angle directs the jet radially outward and in the direction of rotor rotation or chamber motion thereby mixing the gases in the trailing portion with the forwardly located main body of hot gases. This jet induced mixing continues into the exhaust phase as shown in FIGS. 6 and 7 and by the graph in FIG. 9 with the jet becoming particularly violent when the exhaust port is opened at about 80° rotor angle after top-dead-center since this event very rapidly decreases main chamber presure and thus the pressure differential across the nozzle forcing the injection. Shortly thereafter at about 90° rotor angle after top-dead-center the rotor side again closes the nozzle 88 and on continuing rotor rotation the same operation is repeated by the plenum and nozzle on the following chambers. The separate plenum 82 and nozzle 90 provide the same operation for the chambers 46 in the other bank.

Although the plenum and nozzle can also be arranged in the rotor housing, the side wall is preferred because it is believed to be less affected by leakage past the seals. However, it is understood that such an arrangement in the rotor housing would be more centrally located relative to the main chambers and could be advantageous in obtaining better mixing. Furthermore, in the case of an individual plenum for each bank of working chambers as shown, the filling rate can be controlled by installation of a check valve which would permit a difference in filling and emptying times to be realized to obtain different mixing conditions. In addition, for a two-rotor engine as shown it is also possible to use a common plenum rather than separate ones and in that case the plenums shown are simply joined.

The above described embodiments are illustrative of the invention which may be modified with the scope of the appended claims.

I claim:

1. A rotary combustion engine comprising housing means having an inner peripheral wall and oppositely facing side walls, a rotor rotatably mounted in said housing means between said side walls with apexes that remain adjacent said peripheral wall as said rotor rotates, said rotor and said walls cooperatively providing a plurality of chambers spaced around said rotor that expand and contract while moving with said rotor, said housing means having an intake port openable by said rotor for delivering a combustible gaseous mixture to said chambers as they expand in an intake phase prior to contracting in a compression phase, ignition means for igniting the mixture in said chambers following their compression phase to cause their expansion in an expansion phase, said housing means having an exhaust port openable by said rotor for receiving exhaust gases from said chambers as they contract in an exhaust phase, said housing means further having a plenum, and a nozzle in one of said walls openable by said rotor for providing communication between said plenum and said chambers only as they expand during their expansion phase, said nozzle being located relative to said rotor so that said communication is initiated during the gas expansion process but after rapid combustion is complete when the pressure in said plenum is relatively low whereby on establishing said communication said plenum is charged with relatively high-pressure hot gaseous products of combustion from the connected chamber until plenum and chamber pressure are equal and thereafter on continued rotor rotation and lowering chamber pressure below plenum pressure there is caused a relatively hot gaseous jet to be discharged from said nozzle into a trailing portion of the connected chamber during the remainder of the expansion phase to enhance burning of the gases in the trailing portion during the remainder of the expansion phase and into the exhaust phase.

2. A rotary combustion engine comprising housing means having an inner peripheral wall and oppositely facing side walls, a rotor rotatably mounted in said housing means between said side walls with apexes that remain adjacent said peripheral wall as said rotor rotates, said rotor and said walls cooperatively providing a plurality of chambers spaced around said rotor that expand and contract while moving with said rotor, said housing means having an intake port openable by said rotor for delivering a combustible gaseous mixture to said chambers as they expand in an intake phase prior to contracting in a compression phase, ignition means for igniting the mixture in said chambers following their compression phase to cause their expansion in an expansion phase, said housing means having an exhaust port openable by said rotor for receiving exhaust gases from said chambers as they contract in an exhaust phase, said housing means further having a plenum, and a nozzle in one of said walls openable by said rotor for providing communication between said plenum and said chambers only as they expand during their expansion phase, said nozzle being located relative to said rotor so that said communication is initiated during the gas expansion process but after rapid combustion is complete when the pressure in said plenum is relatively low whereby on establishing said communication said plenum is charged with relatively high-pressure hot gaseous products of combustion from the connected chamber until plenum and chamber pressure are equal and thereafter on continued rotor rotation and lowering chamber pressure below plenum pressure there is caused a relatively hot gaseous jet to be discharged from said nozzle into a trailing portion of the connected chamber to enhance mixing of the relatively hot gaseous products with any relatively rich unburned gases in the trailing portion during the remainder of the expansion phase and thereby enhance afterburning of the gases in the exhaust phase.

3. A rotary combustion engine comprising housing means having an inner peripheral wall and oppositely facing side walls, rotor rotatably mounted in said housing means between said side walls with apexes that remain adjacent said peripheral wall as said rotor rotates, said rotor and said walls cooperatively providing a plurality of chambers spaced around said rotor that expand and contract while moving with said rotor, said housing means having an intake port openable by said rotor for delivering a combustible gaseous mixture to said chambers as they expand in an intake phase prior to contracting in a compression phase, ignition means for igniting the mixture in said chambers following their compression phase to cause their expansion in an expansion phase, said housing means having an exhaust port openable by said rotor for receiving exhaust gases from said chambers as they contract in an exhaust phase, said housing means having a plenum behind one of said side walls, a nozzle in said one side wall openable by the opposing side of said rotor for providing communication between said plenum and said chambers only as they expand during their expansion phase, said nozzle being radially and angularly located in said one side wall and relative to said rotor so that said communication is initiated during the gas expansion process but after rapid combustion is complete when the pressure in said plenum is relatively low whereby on extablishing said communication said plenum is charged with relatively high-pressure hot gaseous products of combustion from the connected chamber until plenum and chamber pressure are equal and thereafter on continued rotor rotation and lowering chamber pressure below plenum pressure their is caused a relatively hot gaseous jet to be discharged from said nozzle into a trailing portion of the connected chamber during the remainder of the expansion phase, and said nozzle set at an angle relative to the chamber walls and direction of rotor rotation so as to direct said jet toward said peripheral wall and in the direction of rotor rotation and chamber motion.

* * * * *